(12) United States Patent
Zhang et al.

(10) Patent No.: US 12,574,123 B2
(45) Date of Patent: Mar. 10, 2026

(54) REAL-TIME PHOTON NUMBER DETERMINATION

(71) Applicant: Xanadu Quantum Technologies Inc., Toronto (CA)

(72) Inventors: Yanbing Zhang, Toronto (CA); Jannat Hundal, Toronto (CA); Leonhard Neuhaus, Ingolstadt (DE); Lukas Helt, Toronto (CA)

(73) Assignee: Xanadu Quantum Technologies Inc., Toronto (CA)

( * ) Notice: Subject to any disclaimer, the term of this patent is extended or adjusted under 35 U.S.C. 154(b) by 299 days.

(21) Appl. No.: 18/538,154

(22) Filed: Dec. 13, 2023

(65) Prior Publication Data

US 2024/0214078 A1 Jun. 27, 2024

Related U.S. Application Data

(60) Provisional application No. 63/434,775, filed on Dec. 22, 2022.

(51) Int. Cl.
| | |
|---|---|
| *H04B 10/70* | (2013.01) |
| *G01J 1/42* | (2006.01) |
| *G06N 10/60* | (2022.01) |
| *H04Q 11/00* | (2006.01) |
| *G01J 1/44* | (2006.01) |

(52) U.S. Cl.
CPC ............... *H04B 10/70* (2013.01); *G01J 1/42* (2013.01); *G06N 10/60* (2022.01); *H04Q 11/0062* (2013.01); *G01J 2001/442* (2013.01); *H04Q 2011/0073* (2013.01)

(58) Field of Classification Search
CPC ...................................................... H04B 10/70
See application file for complete search history.

(56) References Cited

U.S. PATENT DOCUMENTS

| | | | |
|---|---|---|---|
| 2017/0350990 A1* | 12/2017 | Chmeissani Raad ... | G01T 1/247 |
| 2019/0145822 A1* | 5/2019 | Kim ......................... | G01J 1/44 |
| | | | 250/336.2 |

FOREIGN PATENT DOCUMENTS

| | | | | |
|---|---|---|---|---|
| EP | 3502636 B1 * | 10/2022 | ................ | G01J 1/44 |

OTHER PUBLICATIONS

Becerra et al., Photon number resolution enables quantum receiver for realistic coherent optical communications. Nature Photon 9, 48-53 (2015). https://doi.org/10.1038/nphoton.2014.280.
(Continued)

*Primary Examiner* — Shi K Li

(57) ABSTRACT

Systems, methods and computer program products for real-time routing of optical signals. A signal trace is received by a signal processor from a photon-number resolving detector. The signal trace is produced by the photon-number resolving detector in response to an optical pulse from a light source (e.g. a pulsed laser). The signal processor determines the photon number of the optical pulse by applying a function to the signal trace and one or more reference traces. A feedback signal is then defined based on the photon number of the optical pulse. The feedback signal is used to control the operation of a switch positioned in the path of a related optical signal. The switch operates to define the forward routing path of the related optical signal.

25 Claims, 8 Drawing Sheets

(56) References Cited

OTHER PUBLICATIONS

Eaton et al., Resolving 100 photons and quantum generation of unbiased random numbers. arXiv preprint, arXiv:2205.01221 (2022). https://doi.org/10.48550/arXiv.2205.01221.

Morais et al., Precisely determining photon-number in real-time. arXiv preprint, arXiv:2012.10158 (2020). https://doi.org/10.48550/arXiv.2012.10158.

Li et al., En route to nanoscopic quantum optical imaging: counting emitters with photon-number-resolving detectors. Optics Express 30(8), 12495-12509 (2022). https://doi.org/10.1364/OE.454412.

* cited by examiner

200

300

RECEIVE ELECTRICAL SIGNAL TRACE   310

CALCULATE DOT PRODUCT VALUE OF SIGNAL TRACE AND REFERENCE TRACE   320

DETERMINE PHOTON NUMBER BASED ON THE DOT PRODUCT VALUE   330

REAL-TIME PHOTON NUMBER DETERMINATION

CROSS-REFERENCE TO RELATED APPLICATION

This application claims priority from U.S. Provisional Patent Application Ser. No. 63/434,775, filed Dec. 22, 2022, the entire contents of which are hereby incorporated by reference.

FIELD

This document relates to quantum optics. In particular, this document relates to systems and methods for routing optical signals using real-time photon number determination.

BACKGROUND

Real-time feed-forward action is required in nearly every subsystem of photonic quantum computation, ranging from deterministic source generation to gate operation and error correction. The feedback signal in a feed-forward process is typically obtained by measuring quantum states using nanowire single photon detectors (NSPDs) for discrete-variable-based quantum computing, or homodyne/heterodyne detectors for continuous-variable-based quantum computing. However, both of these measurement systems lack intrinsic photon number resolution.

SUMMARY

The following summary is intended to introduce the reader to various aspects of the detailed description, but not to define or delimit any invention.

Systems, methods and computer program products are provided for real-time routing of optical signals. A signal trace is received by a signal processor from a photon-number resolving detector. The signal trace is produced by the photon-number resolving detector in response to an optical pulse from a light source (e.g. a pulsed laser). The signal processor determines the photon number of the optical pulse by applying a function to the signal trace and one or more reference traces. A feedback signal is then defined based on the photon number of the optical pulse. The feedback signal is used to control the operation of a switch positioned in the path of a related optical signal. The switch operates to define the forward routing path of the related optical signal.

According to some aspects, the present disclosure provides a method comprising: receiving, by a signal processor, an electrical signal trace produced by a photon-number resolving detector in response to a first optical pulse; determining, by the signal processor, a photon number associated with the first optical pulse by applying a function to the signal trace and at least one reference trace; and transmitting, by the signal processor, a control signal to a related signal switch, wherein the control signal is defined based on the photon number associated with the first optical pulse, wherein the control signal is defined to cause the related signal switch to switch to a specified routing path to route a related optical pulse in response to the control signal.

The specified routing path can be a particular routing path from amongst a plurality of potential routing paths, and the control signal can be defined to cause the related signal switch to route the related optical pulse to the particular routing path determined based on the photon number.

The plurality of potential routing paths can include a discard path in which the related optical pulse is discarded.

The method can include delaying the related optical pulse at least until the photon number is determined.

The related optical pulse can be delayed by less than one millisecond.

Determining the photon number by applying the function to the signal trace and the at least one reference trace can include: determining a dot product value as a dot product of the signal trace and a single reference trace; and comparing the dot product value to a plurality of potential dot product values to determine the photon number.

Each potential dot product value can correspond to a particular photon number.

Determining the photon number by applying the function to the signal trace and the at least one reference trace can include: determining a plurality of trace error values, wherein each trace error value is determined based on the signal trace and a particular reference trace from amongst a plurality of reference traces; and determining the photon number based on a lowest trace error value in the plurality of trace error values.

Each reference trace can correspond to an expected trace for a given photon number.

The plurality of trace error values can be determined using one of a Euclidean distance metric and a Manhattan distance metric.

The at least one reference trace can be determined in pre-processing.

The method can include receiving the first optical pulse at the photon-number resolving detector; and transmitting to the signal processor, from the photon-number resolving detector, the electrical signal pulse.

The method can include for each additional optical pulse of a plurality of additional optical pulses: receiving, by the signal processor, an additional signal trace produced by the photon-number resolving detector in response to that additional optical pulse; determining, by the signal processor, an additional photon number associated with that additional optical pulse by applying the function to the additional signal trace and the at least one reference trace; and transmitting, by the signal processor, an additional control signal to the related signal switch, where the additional control signal is defined based on the additional photon number associated with the additional optical pulse, where the additional control signal is defined to cause the related signal switch to switch to an additional specified routing path to route an additional related optical pulse in response to the additional control signal.

The method can include receiving the plurality of additional optical pulses at the photon-number resolving detector; and for each additional optical pulse, transmitting to the signal processor, from the photon-number resolving detector, the additional signal trace produced by the photon-number resolving detector in response to that additional optical pulse.

The photon-number resolving detector can receive optical pulses at a rate of at least 100 KHz.

The method can include, for each additional optical pulse: subtracting a characteristic trace value from the additional signal trace prior to determining the additional photon number associated with that additional optical pulse, where the characteristic trace value corresponds to a preceding photon number determined from an immediately preceding optical pulse.

The photon-number resolving detector can receive optical pulses at a rate of at least 500 KHz.

The method can include performing stray tail subtraction on the signal trace prior to determining the photon number.

The signal processor can include a Field-Programmable Gate Array or an Application-Specific Integrated Circuit.

The photon-number resolving detector can include a transition-edge sensor.

The related signal switch can include an optical multiplexer.

The related signal switch can include a variable beam splitter.

The method can include receiving, by the signal processor, a second electrical signal trace produced by a second photon-number resolving detector in response to a second first optical pulse; determining, by the signal processor, a second photon number associated with the second optical pulse by applying the function to the second electrical signal trace and a second at least one reference trace; and defining the control signal based on a combination of the second photon number and the photon number associated with the first optical pulse.

The first optical pulse can correspond to a first optical mode; and the second optical pulse can correspond to a second optical mode, where the second optical mode is different from the first optical mode.

The related optical pulse can include an entanglement of the first optical mode and the second optical mode.

According to some aspects, the present disclosure provides a system comprising: a signal processor electrically coupled to a photon-number resolving detector and to a related signal switch, wherein the photon-number resolving detector is arranged to receive optical pulses from a light source; and a non-transitory storage memory; wherein the non-transitory storage memory has stored thereon at least one reference trace; and the signal processor is configured to: receive an electrical signal trace produced by the photon-number resolving detector in response to a first optical pulse; determine a photon number associated with the first optical pulse by applying a function to the signal trace and at least one reference trace; and transmit a control signal to the related signal switch, wherein the control signal is defined based on the photon number associated with the first optical pulse, and the control signal is defined to cause the related signal switch to switch to a specified routing path to route a related optical pulse in response to the control signal.

The specified routing path can be a particular routing path from amongst a plurality of potential routing paths, and the control signal can be defined by the signal processor to cause the related signal switch to route the related optical pulse to the particular routing path determined based on the photon number.

The plurality of potential routing paths can include a discard path in which the related optical pulse is discarded.

The system can include a signal delay operable to delay the related optical pulse at least until the photon number is determined.

The signal delay can be configured to delay the related optical pulse by less than one millisecond.

The signal processor can be configured to determine the photon number by applying the function to the signal trace and the at least one reference trace by: determining a dot product value as a dot product of the signal trace and a single reference trace; and comparing the dot product value to a plurality of potential dot product values to determine the photon number.

4

Each potential dot product value can correspond to a particular photon number.

The signal processor can be configured to determine the photon number by applying the function to the signal trace and the at least one reference trace by: determining a plurality of trace error values, where each trace error value is determined based on the signal trace and a particular reference trace from amongst a plurality of reference traces; and determining the photon number based on a lowest trace error value in the plurality of trace error values.

Each reference trace can correspond to an expected trace for a given photon number.

The signal processor can be configured to determine the plurality of trace error values using one of a Euclidean distance metric and a Manhattan distance metric.

The at least one reference trace can be determined for the photon-number resolving detector in pre-processing.

The system can include the photon-number resolving detector, where the photon-number resolving detector is configured to: receive the first optical pulse; and produce the electrical signal pulse in response to the first optical pulse.

The signal processor can be further configured to: for each additional optical pulse of a plurality of additional optical pulses: receive an additional signal trace produced by the photon-number resolving detector in response to that additional optical pulse; determine an additional photon number associated with that additional optical pulse by applying the function to the additional signal trace and the at least one reference trace; and transmit an additional control signal to the related signal switch in response to determining the additional photon number, where the additional control signal corresponds to the additional photon number associated with the additional optical pulse, where the additional control signal is defined to cause the related signal switch to switch to an additional specified routing path to route an additional related optical pulse in response to the additional control signal.

The system can include the photon-number resolving detector, where the photon-number resolving detector is configured to: receive the plurality of additional optical pulses; and for each additional optical pulse, transmit the additional signal trace produced by the photon-number resolving detector in response to that additional optical pulse to the signal processor.

The photon-number resolving detector can be configured to receive optical pulses at a rate of at least 100 kHz.

The signal processor can be further configured to, for each additional optical pulse: subtract a characteristic trace value from the additional signal trace prior to determining the additional photon number associated with that additional optical pulse, where the characteristic trace value corresponds to a preceding photon number determined from an immediately preceding optical pulse.

The photon-number resolving detector can be configured to receive optical pulses at a rate of at least 500 KHz.

The signal processor can be further configured to perform stray tail subtraction on the signal trace prior to determining the photon number.

The signal processor can include a Field-Programmable Gate Array or an Application-Specific Integrated Circuit.

The photon-number resolving detector can include a transition-edge sensor.

The related signal switch can include an optical multiplexer.

The related signal switch can include a variable beam splitter.

The signal processor can be further configured to: receive a second electrical signal trace produced by a second photon-number resolving detector in response to a second optical pulse; determine a second photon number associated with the second optical pulse by applying the function to the second electrical signal trace and a second at least one reference trace; and define the control signal based on a combination of the second photon number and the photon number associated with the first optical pulse.

The first optical pulse can correspond to a first optical mode; and the second optical pulse can correspond to a second optical mode, where the second optical mode is different from the first optical mode.

The related optical pulse can include an entanglement of the first optical mode and the second optical mode.

According to some aspects, the present disclosure provides a non-transitory computer readable medium storing processor-executable instructions, which, when executed by a processor, cause the processor to carry out a method comprising: receiving, by a signal processor, an electrical signal trace produced by a photon-number resolving detector in response to a first optical pulse; determining, by the signal processor, a photon number associated with the first optical pulse by applying a function to the signal trace and at least one reference trace; and transmitting, by the signal processor, a control signal to a related signal switch, wherein the control signal is defined based on the photon number associated with the first optical pulse, wherein the control signal is defined to cause the related signal switch to switch to a specified routing path to route a related optical pulse in response to the control signal.

The computer readable medium can further store processor-executable instructions, which, when executed by a processor, cause the processor to carry out a method, wherein the method is further described herein.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
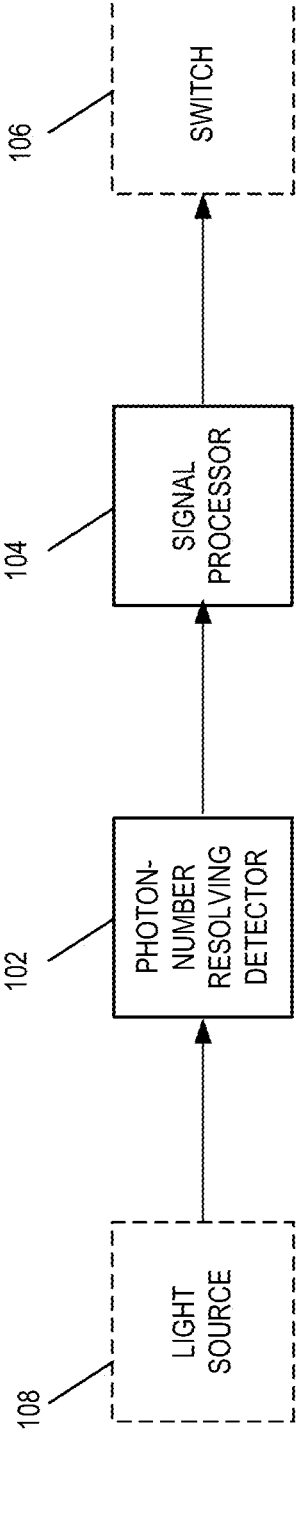
FIG. 1 is a block diagram illustrating an example system for optical signal routing.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

The terms "coupled" or "coupling" as used herein can have several different meanings depending on the context in which these terms are used. For example, the terms coupled or coupling can have a mechanical, electrical or communicative connotation. For example, as used herein, the terms coupled or coupling can indicate that two elements or devices can be directly connected to one another or connected to one another through one or more intermediate elements or devices via an electrical element, electrical signal, or a mechanical element depending on the particular context. Furthermore, the term "communicative coupling" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Described herein are systems, methods and computer program products for routing optical signals using real-time photon number determination. The systems, methods, and devices described herein may be implemented as a combination of hardware or software. In some cases, the systems, methods, and devices described herein may be implemented, at least in part, by using one or more computer programs, executing on one or more programmable devices including at least one processing element, and a data storage element (including volatile and non-volatile memory and/or storage elements). These devices may also have at least one input device (e.g. a pushbutton keyboard, mouse, a touchscreen, and the like), and at least one output device (e.g. a display screen, a printer, a wireless radio, and the like) depending on the nature of the device.

Some elements that are used to implement at least part of the systems, methods, and devices described herein may be implemented via software that is written in a high-level procedural language such as object-oriented programming. Accordingly, the program code may be written in any suitable programming language such as Python or C for example. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The present disclosure relates to a system, method, and computer program product for real-time routing of optical signals based on the photon number of one or more related optical signals. Real-time feed-forward action is required in nearly every subsystem of photonic quantum computation, ranging from deterministic source generation to gate operation and error correction. Real-time photon number resolution can facilitate the routing of related optical signals within a quantum computation system.

Real-time photon number resolution can play an important role in the field of quantum optics particularly in relation to the transition from Gaussian to non-Gaussian resources. The non-Gaussian resources, be it states, operations, or measurements, are essential or at least advantageous for many applications, such as quantum computation, quantum error correction, or quantum communication. The ability to discriminate between states with different photon numbers (particularly in real-time) is useful for non-Gaussian quantum state preparation, state characterization (tomography), increasing the probability of generating non-Gaussian quantum states through multiplexing, the deterministic implementation of non-Gaussian operations using non-Gaussian ancilla states, and implementation of the KLM quantum protocol.

mentation of non-Gaussian operations using non-Gaussian ancilla states, and implementation of the KLM quantum protocol.

In the field of quantum optics, photon detectors are used to detect the number of photons present in a pulse of light radiation. Conventional single photon detectors often lack the ability to perform photon number resolution for multi-photon states. Photon-number resolving (PNR) detectors offer the capability to accurately characterize the number of incident photons in an incident light pulse.

The present disclosure makes use of photon-number resolving detectors as part of a real-time photon number resolution process that can be used to generate a feedback/control signal for forward routing of optical signals. For example, transition-edge sensor-based photon-number resolving detectors can resolve photon numbers for events containing more than 35 photons per detector. These detectors are also typically faster than conventional detectors and have more than 95% quantum efficiency (the ratio of incident photons to converted electrons). Examples of the present disclosure can make use of transition-edge sensor-based photon-number resolving detectors to provide photon number determination at a pulse rate of more than 500 kHz and even upwards of 1 MHZ (or greater depending on the latency of the transition-edge sensor itself).

Many existing systems perform photon-number resolution in post-processing. However, real-time photon number resolution can provide significant advantages for many practical applications. Real-time photon number resolution can be performed in a timeframe that allows the related optical signals to be used in the same process flow—i.e. within a timeframe (e.g. less than 10 microseconds) during which the photons of the related optical signal can be maintained alive (e.g. through the use of a delay buffer and/or delay loop). For example, real-time photon number resolution can be used to herald the entanglement of related optical signals.

For many practical applications, it is important to herald (i.e. signal in real-time) the entanglement of an optical signal. That is, a control signal can be defined to flag the existence of the entangled state so that it can be manipulated and transferred. For example, a control signal can be defined to flag the existence of a particular entangled state in a related optical signal so that the related optical signal can be correctly routed for subsequent manipulation or measurement. The control signal may identify whether the related optical signal has the correct signal properties (e.g. a desired pattern of photons in specified optical modes) for further processing or whether the related optical signal should be re-routed or even discarded (e.g. when a desired pattern of photons is not present).

Referring now to FIG. 1, shown therein is a block diagram illustrating an example system 100 that can be used to route optical signals. System 100 can be used to determine the photon number of an incoming light pulse generated by a light source 108, generate a control signal in response to the determined photon number, and use the control signal to operate a switch 106 to select the forward routing path for a related optical signal. The photon number and related control signal can be determined in real-time in order to route the related optical signal while requiring only a minimal delay of the related optical signal.

As shown in FIG. 1, system 100 includes a photon-number resolving detector 102 and a signal processor 104. System 100 can also include a light source 108 and a switch 106, however it should be understood that aspects of the signal routing methods described herein can be implemented in the absence of the switch 106 and the light source 108. Some aspects of the systems and methods described herein may be implemented even in the absence of the photon-number resolving detector 106—i.e. by components of the signal processor 104. Furthermore, although only one light source 108, photon-number resolving detector 102 and signal processor 104 are shown in the example of FIG. 1, it should be understood that system 100 can include multiple light sources 108, photon-number resolving detectors 102 and signal processors 104.

The photon-number resolving detector 102 is arranged to receive an optical pulse from light source 108. Although shown as a component of system 100, light source 108 may be separate from, and located outside of, system 100 as an independent component or a subcomponent of another system. The light source 108 may, for example, be a pulsed photon source that is capable of generating faint laser pulses, or a resonator capable of generating squeezed light pulses or single-photon generating sources. The light source 108 can include suitable optical components usable to generate the optical pulse. Optionally, the light source 108 can be configured to transmit an optical pulse with a particular optical mode.

In some examples, the system 100 can operate with a plurality of light sources 108, each configured to transmit an optical pulse with a corresponding source-specific optical mode. Each light source 108 may be coupled to a different, corresponding photon-number resolving detector 102 of a plurality of photon-number resolving detectors.

Optionally, the plurality of photon-number resolving detectors 102 may be coupled to a plurality of signal processors 104. For example, each photon-number resolving detector 102 may be coupled to a different signal processor 104. Alternatively, some or all of the photon-number resolving detectors 102 in the plurality of photon-number resolving detectors can be coupled to a single signal processor 102.

The photon-number resolving detector 102 is configured to produce an electrical signal trace in response to an optical pulse from light source 108. The photon-number resolving detector 102 can output the electrical signal trace upon absorption of the incident photons generated by the light source 108. The photon-number resolving detector 102 may be any photon detector that is capable of operating within a linear response region of the detector such as, for example, a transition-edge sensor (TES) based PNR detector, or any other appropriate detector. The detector 102 may be cooled to a superconducting state (i.e. on the order of tens or hundreds of milli-Kelvin) such that it has zero electrical resistance and hence zero voltage drop. The absorption of one or more photons causes a temperature change in the absorber of the detector 102, thereby increasing the resistivity of the detector leading to a voltage drop across the detector. The voltage drop may be proportional to the number of photons absorbed by the PNR detector 102.

The signal processor 104 is electrically coupled to the photon-number resolving detector 102. The signal processor 104 is arranged to receive the electrical signal trace produced by the photon-number resolving detector 102 in response to an optical pulse from the light source 108.

The signal processor 104 can be implemented using one or more processors such as a specialized or general purpose microprocessor. The processor(s) control the operation of the signal processor 104 and in general can include any suitable processor such as a microprocessor, controller, digital signal processor, field programmable gate array, application specific integrated circuit, microcontroller, or other suitable computer processor that can provide sufficient processing power, depending on the desired configuration, purposes and requirements of the system 100.

In some cases, it may be preferable to select a special-purpose processor that is specifically configured for fast operation (e.g. where instructions can be defined in firmware) such as an application specific integrated circuit or field-programmable gate array for example. This may help reduce the delay required for the related optical signal prior to determining a forward routing path.

The signal processor 104 can include the processor, a power supply, memory, and a communication module operatively coupled to the processor, the photon-number resolving detector 102, and to the signal switch 106. The memory can include RAM, ROM, one or more hard drives, one or more flash drives or some other suitable data storage elements such as disk drives, etc. Optionally, at least one input device (e.g. a pushbutton keyboard, mouse, a touchscreen, and the like), and at least one output device (e.g. a display screen)

The electrical signal trace from the photon-number resolving detector 102 can be detected and recorded using a data acquisition system. The data acquisition system can be integrated into the signal processor 104. Alternatively, the data acquisition system may be external from, and separate to, the signal processor 104.

The data acquisition system can include appropriate hardware circuitry and/or software components usable to detect and record the electrical signal trace from the photon-number resolving detector. Optionally, the data acquisition system can include one or more amplifiers to amplify the output electrical signals (i.e. voltage drop) of the photon-number resolving detector 102. Optionally, the data acquisition system can include an analog-to-digital converter usable to digitize the electrical signal trace such that the electrical signal trace values are quantized into discrete digital quantities. Alternatively, the data acquisition system may omit an analog-to-digital converter, for instance where the electrical signal trace is analyzed in the analog domain.

The non-transitory memory of the signal processor 104 can store machine-readable instructions executable by the one or more processors of the signal processor 104. The instructions stored on the non-transitory memory of the signal processor 104 can be defined to cause the one or more processors to perform processes relating to determining a photon number associated with an electrical signal trace and/or determining a control signal based on one or more photon numbers associated with optical signal pulses.

The signal processor 104 can also store other data in non-transitory memory, such as one or more reference traces, function output values, desired photon numbers (or desired combinations of photon numbers), and other data that may be used in the determination of a photon number associated with an electrical signal trace and/or a control signal based on one or more photon numbers associated with optical signal pulses.

The related signal switch 106 is coupled to the signal processor 104 and arranged to receive a control signal from the signal processor 104. The related signal switch 106 can be any suitable switch or switch network usable to define a forward routing path for an optical signal. The switch 106 can select the forward routing path for the related optical signal in response to the control signal from the signal processor 104.

Optionally, the related signal switch 106 can include one or more optical multiplexers. The optical multiplexer(s) can be configured to route the related optical signal between a plurality of potential routing paths.

Optionally, the related signal switch 106 can include one or more variable beam splitter(s). For example, a network of variable beam splitters may be used to route the related optical signal between a plurality of potential routing paths.

The related signal switch 106 can define the forward routing path for an optical signal that is related (in some way) to the optical pulse received by the photon-number resolving detector 102. For example, the related signal switch 106 can be arranged to define the forward routing path for an entangled optical signal. The optical pulse received by the photon-number resolving detector 102 may correspond to one of the optical modes that can be entangled in the entangled optical signal.

Optionally, the system 100 can include corresponding light sources 108 and photon-number resolving detectors 102 for each of the optical modes that can be entangled in the entangled optical signal. The control signal may be defined by the signal processor 104 based on a determination of the photon number corresponding to each of those optical modes.

System 100 can also include various additional components beyond those shown in the example of FIG. 1. For example, system 100 may include delay elements (e.g. a delay buffer or delay loop) usable to delay the related optical signal while the photon number(s) and the control signal are identified by the signal processor. The delay elements may ensure that the related optical signal remains 'alive' during the brief period when the photon number(s) and the control signal are determined.

Figure 2:
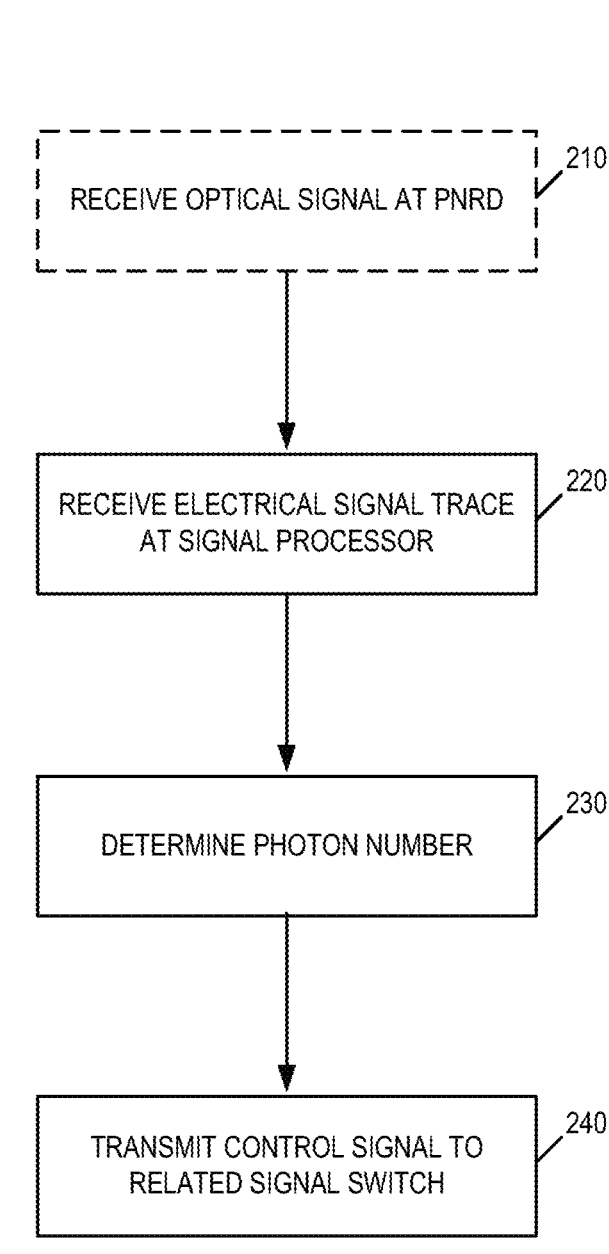
FIG. 2 is a flowchart of an example optical signal routing method.

FIG. 2 shows a flowchart of an example process 200 that can be used to route an optical signal. Process 200 can be implemented by components of a system for routing optical signals, such as the signal processor 104. Process 200 is an example of a process that can determine the photon number of an incoming optical signal in real-time to determine how to route a related optical signal.

Optionally, at 210 a first optical pulse can be received at a photon-number resolving detector. The optical pulse can be received from a pulsed light source such as a laser. The first optical pulse may be an optical pulse associated with a particular optical mode.

In response to the first optical pulse, the photon-number resolving detector can produce an electrical signal trace. The electrical signal trace can then be transmitted to the signal processor from the photon-number resolving detector.

For example, the photon-number resolving detector can include a transition edge sensor. The photons in the first optical pulse interact with the transition edge sensor of the photon-number resolving detector to produce the electrical signal trace.

Figure 4A:
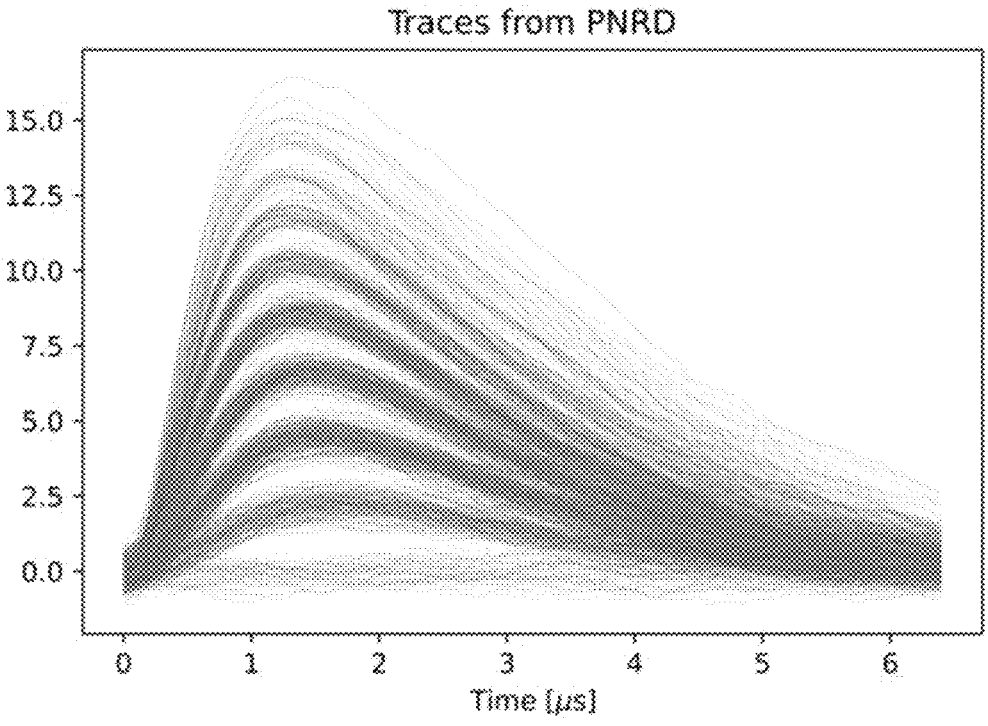
FIG. 4A shows an example plot of test signal traces produced during a calibration procedure.

FIG. 4A shows a plot of example signal traces generated by a photon-number resolving detector. As shown in FIG. 4A, when a pulse arrives at a photon-number resolving detector, such as a transition-edge sensor based photon-number resolving detector, the photon-number resolving detector creates a time-domain voltage waveform (the electrical signal trace) with a characteristic shape that corresponds to the photon number. The waveform includes a rising edge portion, a main body portion and a decaying tail portion as can be seen in FIG. 4A. This voltage waveform can be processed to determine the photon number of the optical pulse based on the shape of the waveform. Optionally, the voltage waveform may be digitized and then processed to determine the photon number.

The photon-number resolving detector can receive pulses from the light source at regular intervals. The rate at which the photon-number resolving detector can receive optical pulses may depend on the latency of the photon-number resolving detector (e.g. the latency of the transition-edge sensor). For example, if a second pulse arrives at the photon-number resolving detector before the characteristic waveform of a first pulse has decayed, an overlap of the waveforms of both pulses can occur resulting in mutual distortion and possibly miscounts. Accordingly, photon-number resolving detectors are often operated with photon pulses well separated (i.e. a second pulse is not received until a first pulse is fully or near fully decayed) in the time domain. This may introduce a limit to the operational speed of the routing system.

In examples described herein, the photon-number resolving detector can receive optical pulses at a rate of at least 100 kHz. In some examples, the photon-number resolving detector can receive optical pulses at a rate of at least 500 KHz. In some examples, the photon-number resolving detector can receive optical pulses at a rate of at least 1 MHz. The rate at which the photon-number resolving detector can receive optical pulses can be limited by the latency of the photon-number resolving detector. In some cases, as discussed below at 230, initial processing of the electrical signal trace can increase the rate at which traces from the photon-number resolving detector can be used to determine the photon number and allow the photon-number resolving detector to receive optical pulses more closely together in the time domain.

At 220, the electrical signal trace produced by a photon-number resolving detector in response to a first optical pulse (e.g. at 210) can be received by a signal processor. The electrical signal trace can be detected and recorded using a data acquisition system separate from, or integrated with, the signal processor.

Optionally, the electrical signal trace may be digitized (e.g. using an analog-to-digital converter). Alternatively, the electrical signal trace may be maintained in the analog domain. This may reduce latency in the processing of the electrical signal trace by omitting the analog-to-digital conversion.

At 230, the signal processor can determine a photon number associated with the first optical pulse (e.g. corresponding to the trace received at 220) by applying a function to the signal trace and at least one reference trace. The at least one reference trace can be stored in a non-transitory memory of (or in communication with) the signal processor.

The at least one reference trace can be determined in a pre-processing stage. A calibration procedure can be performed for the photon-number resolving detector in the pre-processing stage in order to characterize the at least one reference trace for that photon-number resolving detector. For example, a series of test optical pulses can be transmitted to the photon-number resolving detector. The outputs from the photon-number resolving detector can be analyzed in order to characterize the at least one reference trace. Depending on the function being applied, the outputs from the photon-number resolving detector can also be used to determine function output values associated with a given photon number.

In examples where multiple photon-number resolving detectors are used, separate calibration procedures can be performed for each photon-number resolving detector. Accordingly, a separate at least one reference trace (and optionally function output values) may be determined and stored for each photon-number resolving detector.

Optionally, the signal processor can perform various initial processing of the electrical signal trace (received at 220) prior to applying the function. The initial processing of the electrical signal trace may enable the system 100 to receive and process optical signals at a rate that is greater than the latency of the photon-number resolving detector would typically allow. For example, the initial processing of the electrical signal trace may account for residual trace elements (e.g. overlapping waveforms) from preceding optical signals received by the photon-number resolving detector.

In some examples, it may not be necessary to analyze the entire characteristic waveform (i.e. the entire electrical signal trace) in order to determine the photon number associated with an optical pulse. For example, only the first ½ or ⅓ of the trace may be sufficient to accurately determine the photon number associated with the optical pulse.

Optionally, the initial processing of the electrical signal trace can include subtracting a characteristic trace value from the electrical signal trace. The characteristic trace value may be determined based on a preceding photon number determined from an immediately preceding optical pulse. This may reduce distortion caused by the preceding optical pulse and allow the photon number to be determined for optical pulses spaced more closely together in the time domain.

For example, a photon-number resolving detector may receive a first optical pulse and then subsequently receive an additional optical pulse. The photon-number resolving detector can produce a first electrical signal trace corresponding to the first optical pulse. A first photon number corresponding to the first optical pulse can then be determined from the first electrical signal trace.

The photon-number resolving detector can subsequently produce an additional electrical signal trace corresponding to the additional optical pulse. A characteristic trace value corresponding to the first photon number can be identified and subtracted from the additional electrical signal trace prior to determining the additional photon number associated with that additional optical pulse.

The characteristic trace value may be determined during a calibration procedure (e.g. a reference trace corresponding to an optical pulse with specific photon number).

The calibration procedure may include determining characteristic trace values for all photon numbers of interest (or all photon numbers expected to be received by the photon-number resolving detector).

Alternatively or in addition, the initial processing of the electrical signal trace can include performing stray tail subtraction on the electrical signal trace prior to determining the photon number. Stray tail subtraction can be used to remove signal trace values generated in response to unintended light (i.e. noise) reaching the photon-number resolving detector.

Example processes for subtracting a characteristic value and performing stray tail subtraction are described in further detail in Applicant's co-pending patent application Ser. No. 17/994,953 entitled "Photon Number Resolving Methods and Systems", the entirety of which is hereby incorporated by reference.

At 240, the signal processor can transmit a control signal to a related signal switch. The control signal can be defined based on the photon number associated with the first optical pulse (determined at 230).

Optionally, the control signal can be determined based solely on the photon number associated with the first optical pulse (i.e. based on only one photon number).

Alternatively, the control signal can be defined based on a combination of two or more photon numbers. For example, the signal processor can receive a second electrical signal trace produced by a second photon-number resolving detector in response to a second optical pulse. The first and second optical pulses can both correspond to the same related optical pulse. The first and second optical pulses can be received at the same, or substantially the same, time (i.e. coincidentally or substantially coincidentally in the time-domain). Where multiple optical pulses are used, steps 210-230 may be performed substantially or entirely in parallel for each optical pulse.

The signal processor can determine a second photon number associated with the second optical pulse by applying a function to the second electrical signal trace and at least one reference trace. The at least one reference trace used to determine the second photon number may be different from the at least one reference trace, e.g. where the second electrical signal trace is received from a different photon-number resolving detector.

The control signal may then be defined based on a combination of the second photon number (associated with the second optical pulse) and the first photon number (associated with the first optical pulse). Using a combination of photon numbers may allow additional information about the properties of the related optical signal to be used in selecting the routing path for the related optical signal.

For example, the first optical pulse may correspond to a first optical mode and the second optical pulse may correspond to a second optical mode (different from the first optical mode). The related optical pulse may include an entanglement of photons from the first optical mode and the second optical mode. Accordingly, determining the photon number associated with both the first optical mode and the second optical mode may provide an indication of the properties of the entangled signal.

The control signal can be defined to cause the related signal switch to switch to a specified routing path to route a related optical pulse in response to the control signal. The specified routing path can be a particular routing path from amongst a plurality of potential routing paths. The control signal can be defined to cause the related signal switch to route the related optical pulse to the particular routing path determined based on the photon number.

The plurality of potential routing paths can provide different options as to how the related optical pulse is used within a larger system or circuit, e.g. a quantum computation circuit. The control signal can select the potential routing path as the preferred routing path for the particular related optical pulse based on one or more photon number(s). The photon number(s) can provide an indication of the properties of the related optical pulse so that the particular routing path can be selected in response to those properties.

Optionally, the plurality of potential routing paths can include a discard path in which the related optical pulse is discarded. In some cases, the photon number(s) may indicate that the related optical pulse does not have desired properties for further propagation within the larger system. In such a case, the control signal can be defined in response to the combination of photon number(s) to route the related optical pulse to the discard path.

The control signal may be determined based on the photon number or number(s) determined for optical pulses corresponding to the related optical pulse. The signal processor can store a look-up table in non-transitory memory to indicate the photon number(s) or combination(s) of photon numbers associated with a given control signal (i.e. associated with a particular routing path). Accordingly, once the photon number(s) is/are determined at 230, the signal processor can use the look-up table to rapidly determine the control signal to transmit to the related signal switch.

While the photon number(s) and control signal are being determined, the related optical signal pulse may be delayed. The related optical pulse can be delayed at least until the photon number is determined for the optical pulse received at 210. This can ensure that properties of the related optical pulse can be evaluated (or inferred) prior to determining how that related optical pulse should be routed.

Steps 210-240 can be performed in real-time (e.g. within less than one millisecond) to minimize the delay required for the related optical pulse. Accordingly, the related optical pulse can be delayed by less than one millisecond (and in some cases by an even shorter delay period).

The method can then return to step 210 and method 200 can be repeated. Method 200 may be repeated on an ongoing basis as a plurality of additional optical pulses are received at the photon-number resolving detector. Steps 220-240 can then be repeated for each of the additional optical pulses. As will be appreciated, method 200 can be performed at regular intervals (e.g. at the intervals when optical pulses are received by the photon-number resolving detector).

Figure 3:
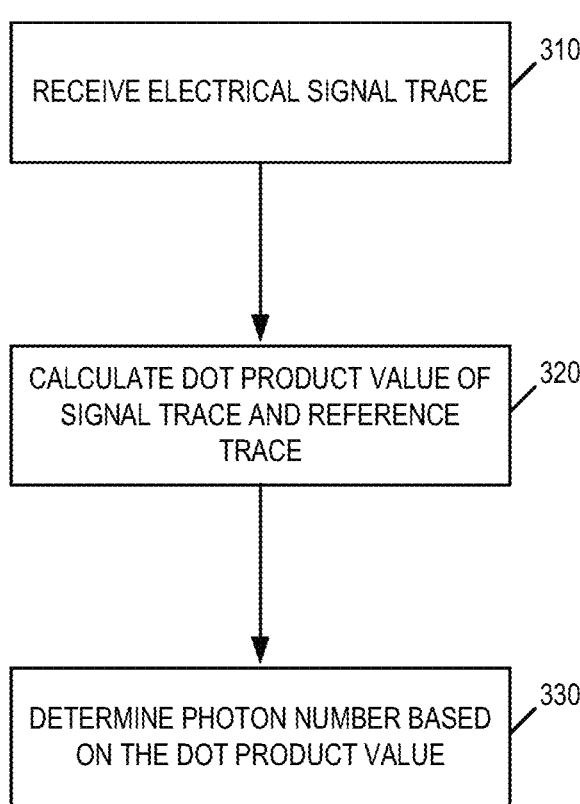
FIG. 3 is a flowchart of an example method for determining a photon number.

Referring now to FIG. 3, shown therein is an example process 300 for determining a photon number associated with an electrical signal trace. The process 300 is an example of a sub-process that may be used at steps 220-230 of method 200. In particular, steps 320-330 of method 300 provide an example process for determining a photon number by applying a dot-product function to the signal trace and a single reference trace. The example process 300 can provide a less computationally intensive method of determining the photon number by applying a function to a received signal trace and a single reference trace. Process 300 can be implemented using various components of an optical routing system, such as the signal processor 104.

At 310, an electrical signal trace can be received. The electrical signal trace can be produced by a photon-number resolving detector in response to a first optical pulse.

The electrical signal trace received at step 310 can be an electrical signal trace such as that received at step 220 of method 200.

At 320, a dot product value can be determined as a dot product of the signal trace (received at 310) and a single reference trace (the at least one reference trace from step 230 of method 200).

Figure 4B:
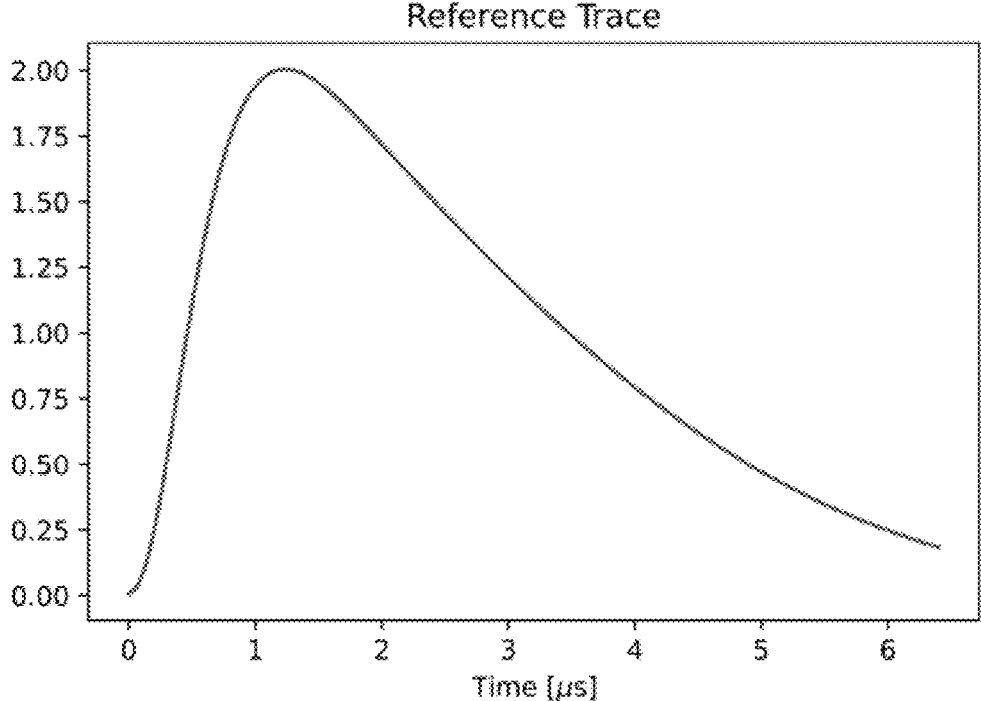
FIG. 4B is a plot of an example reference trace.

FIG. 4B shows a plot of an example reference trace. The example reference trace shown in FIG. 4B is an example of a single reference trace that can be used to calculate a dot product value. The reference trace can be obtained through a calibration procedure performed using the photon-number resolving detector in a preprocessing phase (i.e. prior to operation of system 100).

The calibration procedure can involve a plurality of test optical signals being transmitted to the photon-number resolving detector. Corresponding test signal traces can be produced by the photon-number resolving detector in response to the test optical signals. The test signal traces can be analyzed to determine the reference trace and the range of dot-product values for photon numbers of interest. For example, the test signal traces can be analyzed using Principal Component Analysis (PCA). The calibration procedure may be performed for each photon-number resolving detector in a given system.

The number of test optical signals and test signal traces evaluated during the calibration procedure can vary. Typically, the number of test signals can be in the range of between 100,000-1,000,000, although greater (e.g. 10,000, 000 or more) or fewer (e.g. 1,000) test signals can be evaluated with corresponding tradeoffs in terms of computational complexity and accuracy/noise.

The number and type of signals may also vary based on the distribution of photon numbers of interest. The set of test signals should be selected to ensure that sufficient test signal traces are generated for each photon number of interest.

The dot product function may be applied in the digital domain (e.g. using an electrical signal trace that has been digitized) or in the analog domain (e.g. a weighted sampling of the trace).

At 330, the dot product value (from 320) can be compared to a plurality of potential dot product values to determine the photon number. Each potential dot product value can correspond to a particular photon number.

The signal processor can store the potential dot product values in non-transitory memory to enable the photon number to be determined rapidly once the dot product value has been determined. For example, the signal processor can store a look-up table of dot product values and associated photon numbers. Optionally, the signal processor may only store data related to selected photon numbers of interest.

The potential dot product values for each photon number may include a range of potential dot product values for each photon number. That is, each photon number may be associated with a corresponding range of potential dot product values. If the dot product value (from 320) falls within the range of potential dot product values for a given photon number, the signal trace (and optical pulse) can be determined to be associated with that given photon number.

Figure 4C:
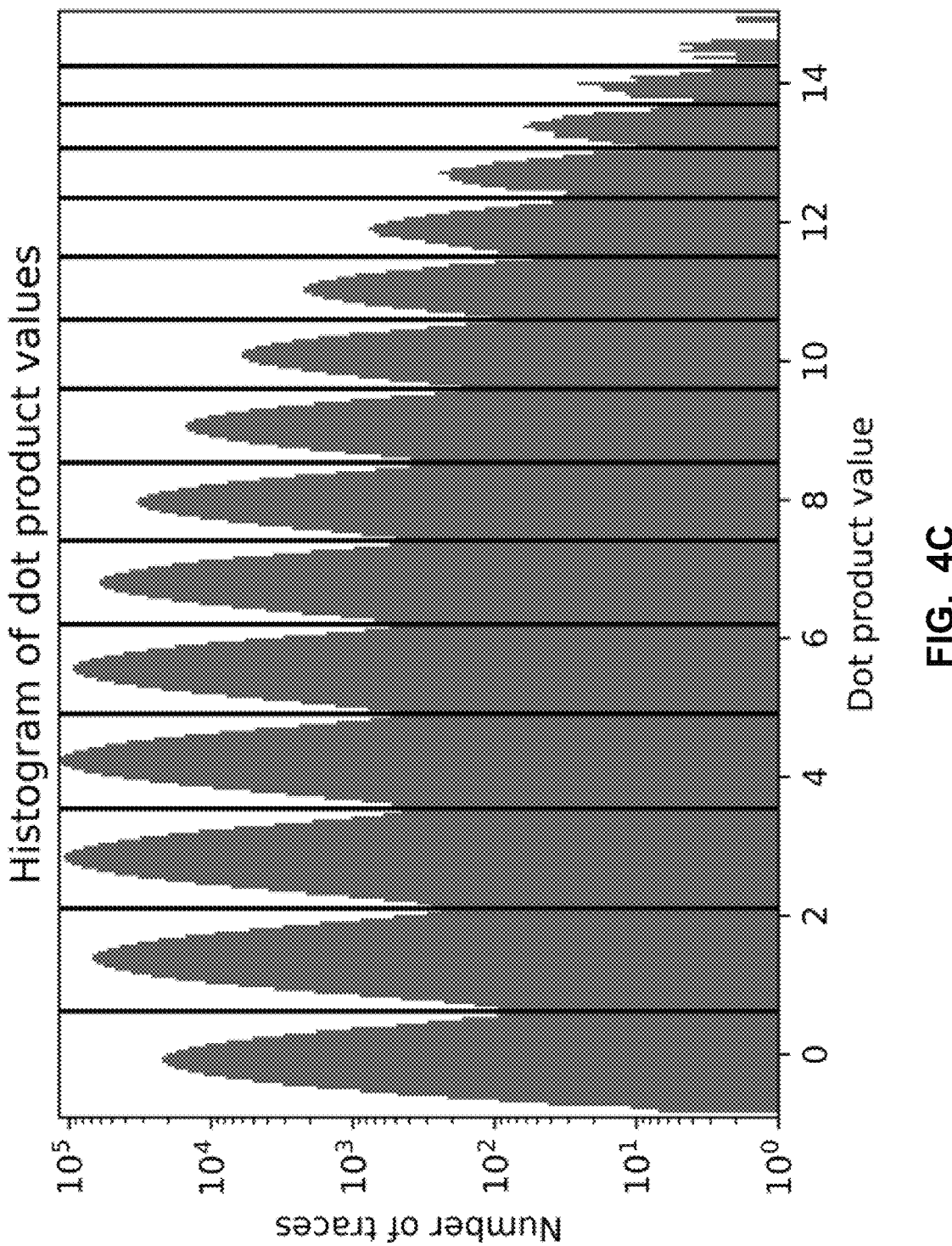
FIG. 4C shows a histogram plot of dot product values between the example reference trace shown in FIG. 3A and test signal traces of different photon number values.

FIG. 4C shows a histogram plot of dot product values for photon numbers ranging from 0 to 20. As shown in FIG. 4C, each photon number corresponds to a range of dot-product values determined for test electrical signal traces and a given reference trace.

As noted above, function output values may be determined for a photon-number resolving detector during a calibration procedure. Accordingly, the dot product values (or dot product ranges) corresponding to each photon number (or photon number of interest) can be determined during the calibration procedure.

Figure 5:
FIG. 5 is a flowchart of another example method for determining a photon number.
Figure 5:
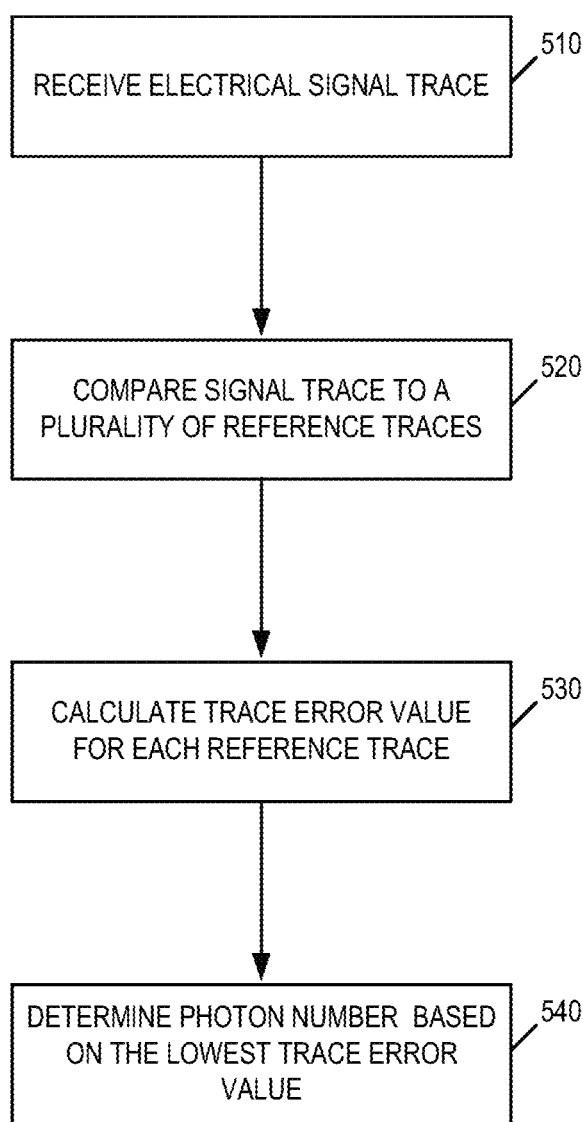

Referring now to FIG. 5, shown therein is an example process 500 for determining a photon number associated with an electrical signal trace. The process 500 is an example of a sub-process that may be used at steps 220-230 of method 200. In particular, steps 520-540 of method 500 provide an example process for determining a photon number by determining which of a set of reference traces matches the signal trace most closely. The example process 500 can provide an accurate and noise-resilient method for determining the photon number by applying a function to a received signal trace and a plurality of reference traces. Process 500 can be implemented using various components of an optical routing system, such as the signal processor 104.

At 510, an electrical signal trace can be received. The electrical signal trace can be produced by a photon-number resolving detector in response to a first optical pulse. The electrical signal trace received at step 510 can be the electrical signal trace received at step 220 of method 200.

At 520, the signal trace (received at 510) can be compared to a plurality of reference traces. Each reference trace in the plurality of reference traces can be stored in non-transitory memory of the signal processor.

Each reference trace can correspond to an expected trace for a specific photon number. The reference trace for each specific photon number can be determined through a calibration procedure performed using the photon-number resolving detector in a preprocessing phase.

At 530, a plurality of trace error values can be determined based on the comparisons performed at 530. For each reference trace in the plurality of reference traces, a corresponding trace error value can be determined based on the comparison of the signal trace and that reference trace.

The trace error value can be determined in various ways. For example, each trace error value can be determined using a Euclidean distance metric. Alternatively, each error value can be determined using a Manhattan distance metric.

Various different types of error values can be calculated. For example, each trace error value can be calculated as a root-mean square error (RMSE) value. Alternatively, each trace error value can be calculated as a mean square error (MSE) value. As will be appreciated, various other types of norm functions can be used to determine the error values.

At 540, the photon number associated with the electrical signal trace (from 510) can be determined based on the lowest trace error value in the plurality of trace error values from 530. That is, the photon number can be selected as the photon number corresponding to the reference trace with the lowest distance value from the signal trace received at 510.

Experimental Results

Figure 6:
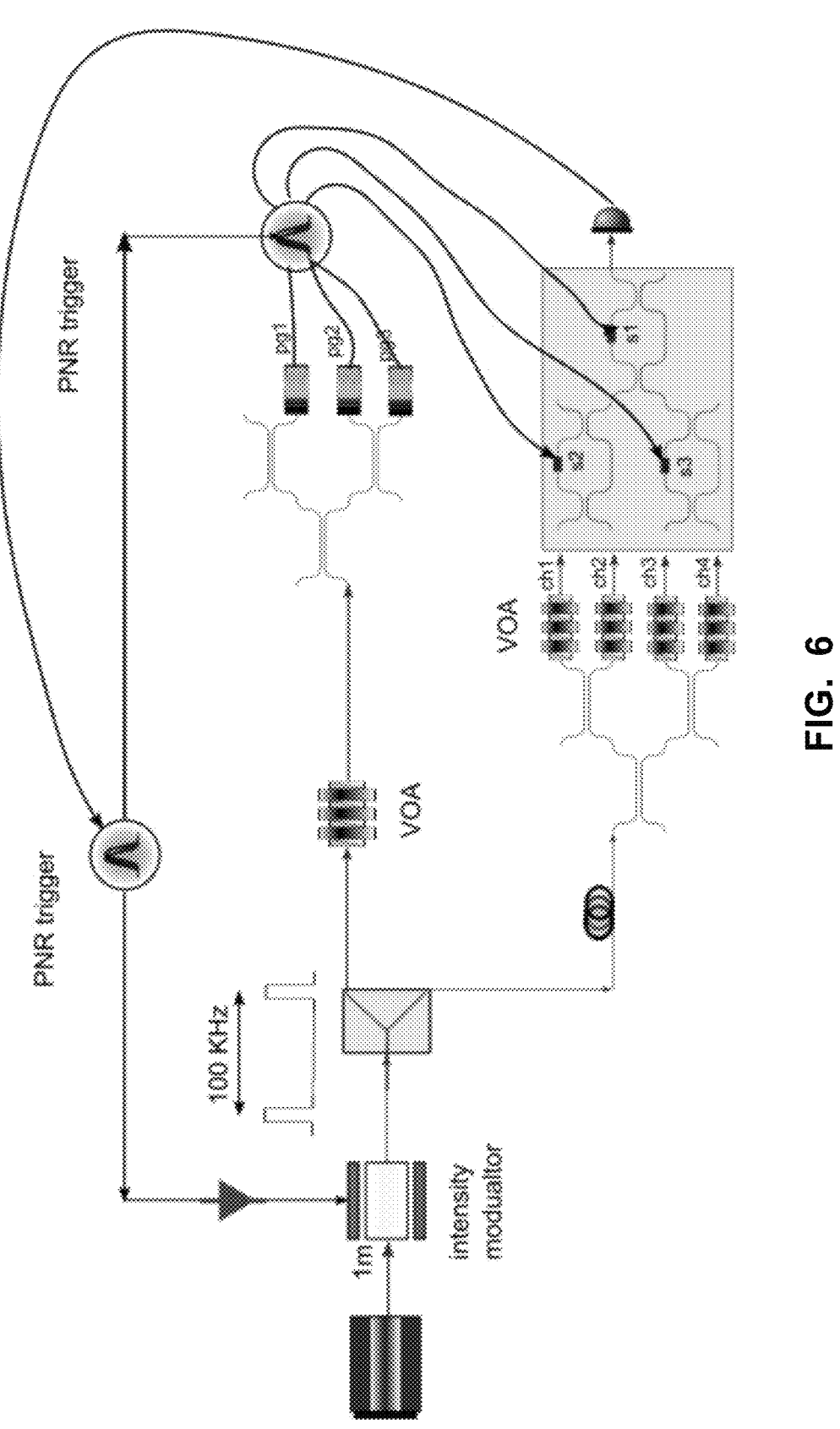
FIG. 6 is a circuit diagram of an example implementation of an optical signal routing system.

The inventors tested an example implementation of the system and methods described herein using a 1×4 optical multiplexer as the switch. FIG. 6 shows a circuit diagram of the example implementation that was tested.

Optical pulses from a laser were propagated through an intensity modulator and a beam splitter to produce an upper and lower path. Along the upper path, each pulse was attenuated using a variational optical attenuator (VOA) and sent through a switching network towards one of three photon-number resolving detectors (pg1, pg2, pg3). The outputs of the photon-number resolving detectors were then fed to a signal processor in the form of an FPGA. The FPGA was programmed to perform an example implementation of the dot product procedure described above in relation FIG. 3 to determine the number of photons detected by each photon-number resolving detector in real-time.

Along the lower path, the optical pulses from the beam splitter were propagated through a delay line before being transmitted through a switching network towards one of four VOAs corresponding to four channels (ch1, ch2, ch3, ch4). The signal that was sent to one of the four channels was then propagated through a programmable switching network. The programmable switching network was configured in response to a control signal defined based on the number of photons detected by the three photon-number resolving detectors in the upper path to allow the signal (the signal that was sent to the one of the four channels) to reach a photon-number resolving detector (that is, the photon-number resolving detectors' photon counting information is "fed forward" to the programmable switching network).

For example, if pg1 detected a specific number of photons, the switching network was programmed such that the signal from ch1 reached the photon-number resolving detector. Similarly, if pg2 detected a specific number of photons, the switching network was programmed such that the signal from ch2 reached the photon-number resolving detector, etc.

Figure 7:
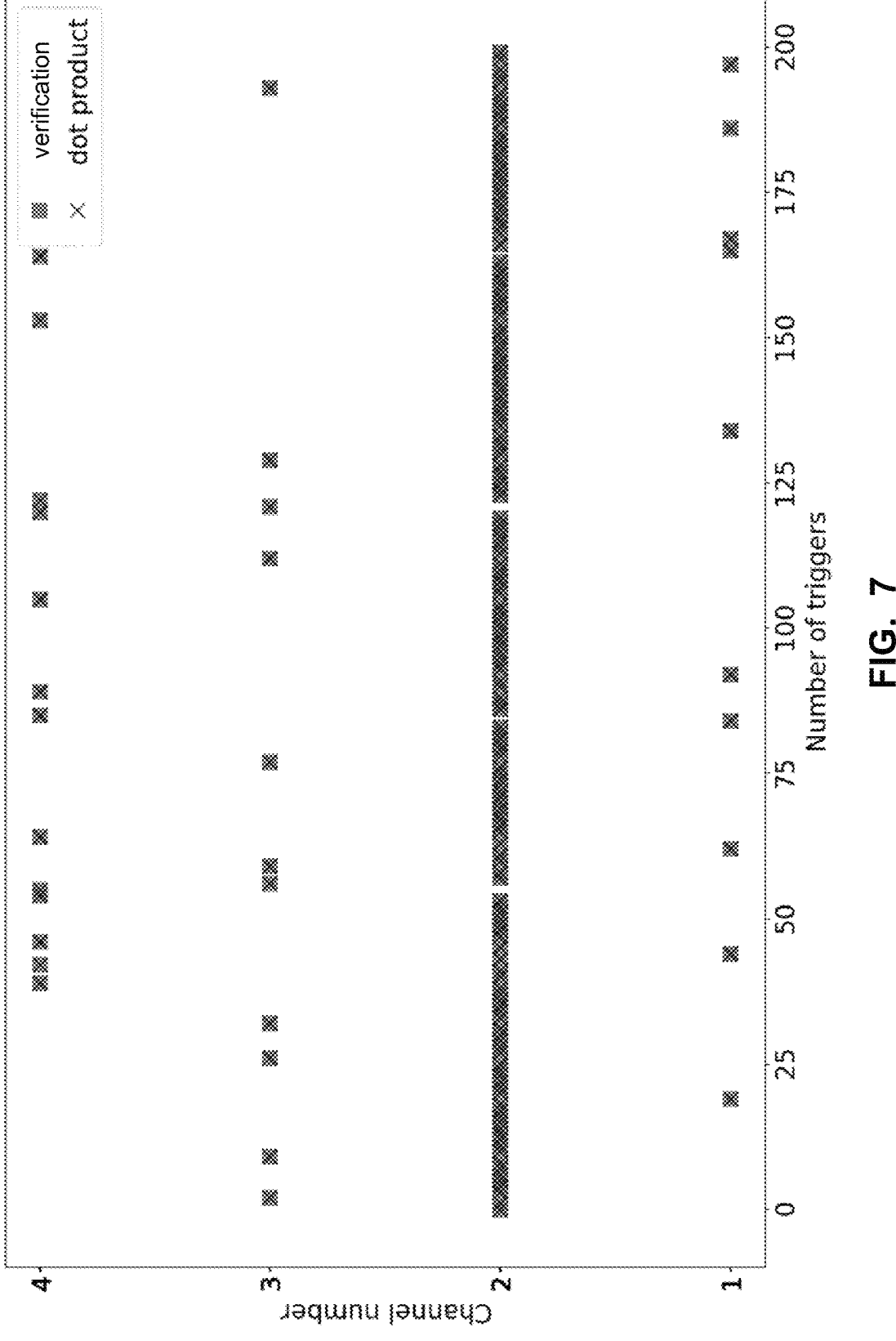
FIG. 7 is a plot of signal routing paths selected during testing of the example implementation of the optical routing system shown in FIG. 6.

FIG. 7 illustrates a plot of the results of testing the example implementation shown in FIG. 6. The plot shown in FIG. 7 includes black 'x' markers indicating the expected channel number corresponding to the detected number of photons as determined using dot product values in accordance with an example implementation of process 300. The expected channel number corresponds to the configuration of the switching network that is associated with the determined number of photons.

The plot shown in FIG. 7 also includes grey squares identifying which of the four channels (along the lower path) the pulse actually came from. In the example implementation tested, the four VOAs were configured to give each channel a different optical power. Accordingly, when a light pulse was detected at the end of the switching network, the channel the light came from was identified based on the optical power of the light.

As can be seen from the plot shown in in FIG. 7, the output from the example dot product procedure was able to accurately identify the channel from which each optical pulse was received. That is, each black 'x' marker (indicating the expected channel number) is co-located with a corresponding grey square, indicating that the expected channel number was the same as the channel number identified from the optical power of the pulse.

While the above description provides examples of one or more processes or apparatuses or systems, it will be appreciated that other processes or apparatuses or systems may be within the scope of the accompanying claims.

It will be understood that the embodiments described in this disclosure and the module, routine, process, thread, or other software component implementing the described methods/processes/frameworks may be realized using standard computer programming techniques and languages. The present application is not limited to particular processors, computer languages, computer programming conventions, data structures, and/or other such implementation details. Those skilled in the art will recognize that the described methods/processes may be implemented as a part of computer-executable code stored in volatile or non-volatile memory, as part of an application-specific integrated chip (ASIC), etc.

As will be apparent to a person of skill in the art, certain adaptations and modifications of the described methods/processes/frameworks can be made, and the above discussed embodiments should be considered to be illustrative and not restrictive.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A method comprising:
receiving, by a signal processor, an electrical signal trace produced by a photon-number resolving detector in response to a first optical pulse;
determining, by the signal processor, a photon number associated with the first optical pulse by applying a function to the signal trace and at least one reference trace; and
transmitting, by the signal processor, a control signal to a related signal switch, wherein the control signal is defined based on the photon number associated with the first optical pulse, wherein the control signal is defined to cause the related signal switch to switch to a specified routing path to route a related optical pulse in response to the control signal.

2. The method of claim 1, wherein the specified routing path is a particular routing path from amongst a plurality of potential routing paths, and the control signal is defined to cause the related signal switch to route the related optical pulse to the particular routing path determined based on the photon number.

3. The method of claim 1, further comprising delaying the related optical pulse at least until the photon number is determined.

4. The method of claim 3, wherein the related optical pulse is delayed by less than one millisecond.

5. The method of claim 1, wherein determining the photon number by applying the function to the signal trace and the at least one reference trace comprises:

determining a dot product value as a dot product of the signal trace and a single reference trace; and comparing the dot product value to a plurality of potential dot product values to determine the photon number.

6. The method of claim 1, wherein determining the photon number by applying the function to the signal trace and the at least one reference trace comprises:

determining a plurality of trace error values, wherein each trace error value is determined based on the signal trace and a particular reference trace from amongst a plurality of reference traces; and determining the photon number based on a lowest trace error value in the plurality of trace error values.

7. The method of claim 1, further comprising:

receiving the first optical pulse at the photon-number resolving detector; and transmitting to the signal processor, from the photon-number resolving detector, the electrical signal pulse.

8. The method of claim 1, further comprising:

for each additional optical pulse of a plurality of additional optical pulses:

receiving, by the signal processor, an additional signal trace produced by the photon-number resolving detector in response to that additional optical pulse;

subtracting a characteristic trace value from the additional signal trace, wherein the characteristic trace value corresponds to a preceding photon number determined from an immediately preceding optical pulse;

determining, by the signal processor, an additional photon number associated with that additional optical pulse by applying the function to the additional signal trace and the at least one reference trace; and transmitting, by the signal processor, an additional control signal to the related signal switch, wherein the additional control signal is defined based on the additional photon number associated with the additional optical pulse, wherein the additional control signal is defined to cause the related signal switch to switch to an additional specified routing path to route an additional related optical pulse in response to the additional control signal.

9. The method of claim 8, wherein the photon-number resolving detector receives optical pulses at a rate of at least 500 KHz.

10. The method of claim 1, further comprising performing stray tail subtraction on the signal trace prior to determining the photon number.

11. The method of claim 1, further comprising:

receiving, by the signal processor, a second electrical signal trace produced by a second photon-number resolving detector in response to a second optical pulse;

determining, by the signal processor, a second photon number associated with the second optical pulse by applying the function to the second electrical signal trace and a second at least one reference trace; and defining the control signal based on a combination of the second photon number and the photon number associated with the first optical pulse.

12. The method of claim 11, wherein:

the first optical pulse corresponds to a first optical mode;

the second optical pulse corresponds to a second optical mode, wherein the second optical mode is different from the first optical mode; and the related optical pulse comprises an entanglement of the first optical mode and the second optical mode.

13. A system comprising:

a signal processor electrically coupled to a photon-number resolving detector and to a related signal switch, wherein the photon-number resolving detector is arranged to receive optical pulses from a light source; and a non-transitory storage memory;

wherein the non-transitory storage memory has stored thereon at least one reference trace; and the signal processor is configured to:

receive an electrical signal trace produced by the photon-number resolving detector in response to a first optical pulse;

determine a photon number associated with the first optical pulse by applying a function to the signal trace and at least one reference trace; and transmit a control signal to the related signal switch, wherein the control signal is defined based on the photon number associated with the first optical pulse, and the control signal is defined to cause the related signal switch to switch to a specified routing path to route a related optical pulse in response to the control signal.

14. The system of claim 13, wherein the specified routing path is a particular routing path from amongst a plurality of potential routing paths, and the control signal is defined by the signal processor to cause the related signal switch to route the related optical pulse to the particular routing path determined based on the photon number.

15. The system of claim 13, further comprising a signal delay operable to delay the related optical pulse at least until the photon number is determined.

16. The system of claim 15, wherein the signal delay is configured to delay the related optical pulse by less than one millisecond.

17. The system of claim 13, wherein the signal processor is configured to determine the photon number by applying the function to the signal trace and the at least one reference trace by:

determining a dot product value as a dot product of the signal trace and a single reference trace; and comparing the dot product value to a plurality of potential dot product values to determine the photon number.

18. The system of claim 13, wherein the signal processor is configured to determine the photon number by applying the function to the signal trace and the at least one reference trace by:

determining a plurality of trace error values, wherein each trace error value is determined based on the signal trace and a particular reference trace from amongst a plurality of reference traces; and determining the photon number based on a lowest trace error value in the plurality of trace error values.

19. The system of claim 13, further comprising the photon-number resolving detector, wherein the photon-number resolving detector is configured to:

receive the first optical pulse; and produce the electrical signal pulse in response to the first optical pulse.

20. The system of claim 13, wherein the signal processor is further configured to:

for each additional optical pulse of a plurality of additional optical pulses:

receive an additional signal trace produced by the photon-number resolving detector in response to that additional optical pulse;

subtract a characteristic trace value from the additional signal trace, wherein the characteristic trace value corresponds to a preceding photon number determined from an immediately preceding optical pulse;

determine an additional photon number associated with that additional optical pulse by applying the function to the additional signal trace and the at least one reference trace; and transmit an additional control signal to the related signal switch in response to determining the additional photon number, wherein the additional control signal corresponds to the additional photon number associated with the additional optical pulse, wherein the additional control signal is defined to cause the related signal switch to switch to an additional specified routing path to route an additional related optical pulse in response to the additional control signal.

21. The system of claim 20, wherein the photon-number resolving detector is configured to receive optical pulses at a rate of at least 500 KHz.

22. The system of claim 13, wherein the signal processor is further configured to perform stray tail subtraction on the signal trace prior to determining the photon number.

23. The system of claim 13, wherein the signal processor is further configured to:

receive a second electrical signal trace produced by a second photon-number resolving detector in response to a second optical pulse;

determine a second photon number associated with the second optical pulse by applying the function to the second electrical signal trace and a second at least one reference trace; and define the control signal based on a combination of the second photon number and the photon number associated with the first optical pulse.

24. The system of claim 23, wherein:

the first optical pulse corresponds to a first optical mode;

the second optical pulse corresponds to a second optical mode, wherein the second optical mode is different from the first optical mode; and the related optical pulse comprises an entanglement of the first optical mode and the second optical mode.

25. A non-transitory computer readable medium storing processor-executable instructions, which, when executed by a processor, cause the processor to carry out a method comprising:

receiving, by a signal processor, an electrical signal trace produced by a photon-number resolving detector in response to a first optical pulse;

determining, by the signal processor, a photon number associated with the first optical pulse by applying a function to the signal trace and at least one reference trace; and transmitting, by the signal processor, a control signal to a related signal switch, wherein the control signal is defined based on the photon number associated with the first optical pulse, wherein the control signal is defined to cause the related signal switch to switch to a specified routing path to route a related optical pulse in response to the control signal.

* * * * *